July 4, 1961  J. M. THAYER ET AL  2,991,367
NEUTRON SOURCE
Original Filed July 30, 1949
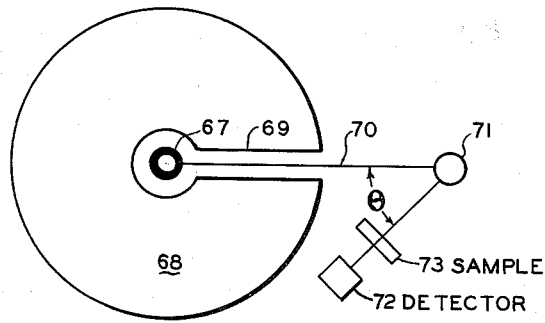
INVENTORS
ROBERT E. FEARON
JEAN M. THAYER
BY
Robert V. Schumacher
ATTORNEY United States Patent Office 2,991,367
Patented July 4, 1961

2,991,367
NEUTRON SOURCE
Jean M. Thayer and Robert E. Fearon, Tulsa, Okla., assignors to Well Surveys, Incorporated, a corporation of Delaware
Original application July 30, 1949, Ser. No. 107,806, now Patent No. 2,712,081, dated June 28, 1955. Divided and this application June 24, 1955, Ser. No. 517,764
5 Claims. (Cl. 250—84.5)

This application is a division of our copending application Serial No. 107,806, filed July 30, 1949, for Method for Neutron Well Logging.

This copending application, now U.S. Patent No. 2,712,081, issued June 28, 1955, relates generally to a method and apparatus for identifying substances existing in difficultly accessible locations, for example, adjacent to a deep narrow drill hole, and more particularly to a method and apparatus for identifying and distinguishing these substances from each other by nuclear reactions in the substances.

The original application related more particularly to methods and apparatus for identifying substances in subsurface geological formations by the specific energy losses of neutrons striking the formations. In order to derive meaning from such measurements as were contemplated, it was necessary to provide a calibrating or adjusting system.

The primary object of this invention is therefore to provide a method or means for determining specific energy losses in samples of substances exposed to neutrons of a determined energy for the purpose of adjusting energy selective neutron detector systems used in well logging. A further object of this invention is to provide a method and apparatus furnishing neutrons of a determined energy, which energy may be selected over a wide range.

Other objects and advantages of the present invention will become apparent from the following detailed description when considered with the drawing, in which:

The sole figure illustrates diagrammatically means for obtaining information about the absorption in a sample of neutrons having a particular energy.

In the sole figure a system is illustrated for determining the existence and location of neutron resonances for interaction between nuclei contained in a sample and a stream of bombarding fast neutrons. These neutron resonances will correspond with specific energy losses which can be used in considering the adjustment of a detector of fast neutron radiation such as was set forth in connection with FIGURE 8 of our copending application now U.S. Patent No. 2,712,081. In this figure there is shown a source of monoenergetic fast neutrons 67 almost surrounded by a mass of paraffin 68. This source of monoenergetic fast neutrons may be such as described in said copending application. Through this mass of paraffin there is provided a narrow opening 69 from which emerges a narrow beam of neutrons 70 which impinges upon a mass of hydrogenous material 71, such as paraffin. The hydrogen of material 71 serves to scatter elastically neutrons derived from the beam 70. The diameter of the hydrogenous mass 71, which may be spherical in shape, is sufficiently small that neutrons of the beam 70 will generally be scattered by having only one collision with a hydrogen nucleus in the mass 71 rather than a plurality of collisions which would occur if the diameter of mass 71 is excessive. The exact dimensions of the material depend upon the energy of the incident neutrons and how pure it is desirable or necessary to keep the neutron energies at the various angles. Obviously, a greater thickness makes it more certain that the incident neutrons of beam 70 strike at least one hydrogen nucleus and not be wasted by passing directly through the material 71. The interaction between neutrons and hydrogen nuclei is a matter of probability, and there are no particular dimensions of material 71 that provide results most desirable in all cases. From the physical constants involved, it is demonstrable that a thickness of the order of one millimeter is satisfactory. A detector 72 is located for and adapted to rotation about mass 71 as a center. A sample 73 is situated at a constant distance from the detector 72 and maintained always on a direct line joining the center of the detector and the center of the scattering mass 71. The angle of rotation determines exactly the loss of energy which a neutron from the beam 70 will suffer in being deflected by the object 71 in the direction of the detector 72. Since all the neutrons of the beam 70 have equal energies the neutrons passing through the sample and in through the detector will also have, at their incidence upon the sample, equal but smaller energies, smaller than the energies of the neutrons in the beam 70. The energies of the neutrons incident upon the sample will, accordingly, vary from the energy of the source for $\theta=180°$ to practically nothing for $\theta=0$, and there will be for each value of $\theta$ a corresponding value of the energy within the above range. One may accordingly restate $\theta$ as a scale of energy and plot the transmission of neutrons through the sample as a function of energy by varying $\theta$. If it is assumed that the mass of a neutron is equal to the mass of a proton, from the principles of conservation of momentum and energy it is clear that the relationship between energy and scattering angle is $$E = E_0 \cos^2(\pi - \theta)$$

where

E is the energy of neutrons scattered at an angle $\theta$,
$E_0$ is the energy of incident neutrons, and
$\theta$ is the angle between the direction of the scattered neutrons and the direction whence came the incident neutrons.

Minima in the said function of energy will correspond with a specific reaction in the sample suffered by the neutrons at that energy.

It is to be understood that this invention is not to be limited to the specific modifications described, but is to be limited only by the following claims.

We claim:

1. A source of fast neutrons of continuously adjustable predetermined energy comprising a source of substantially monoenergetic fast neutrons, a hydrogenous shield for passing only a narrow beam of said monoenergetic fast neutrons, and a thin hydrogenous target disposed in said beam whereby said monoenergetic fast neutrons are scattered in all directions with predetermined energy for each angle of scattering.

2. A source of fast neutrons of continuously adjustable predetermined energy comprising a source of substantially monoenergetic fast neutrons, a hydrogenous shield for passing only a narrow beam of said monoenergetic fast neutrons, and a hydrogenous target disposed in said beam so thin that neutrons are scattered thereby substantially only once whereby said monoenergetic fast neutrons are scattered in all directions with predetermined energy for each angle of scattering.

3. A source of fast neutrons of continuously adjustable predetermined energy comprising means for producing a beam of substantially monoenergetic fast neutrons, a thin hydrogenous target disposed in said beam whereby said monoenergetic fast neutrons are scattered in all directions with predetermined energy for each angle of scattering, and means for selectively utilizing neutrons scattered from said target at a particular angle whereby neutrons of a particular energy are selected.

4. A source of fast neutrons of continuously adjustable predetermined energy comprising a source of substantially monoenergetic fast neutrons, a hydrogenous shield for passing only a narrow beam of said monoenergetic fast neutrons, a thin hydrogenous target disposed in said beam whereby said monoenergetic fast neutrons are scattered in all directions with predetermined energy for each angle of scattering, and means for selectively utilizing neutrons scattered from said target at a selected angle whereby neutrons of a particular energy are selected.

5. Apparatus for providing neutrons of adjustable energy comprising means producing a beam of substantially monoenergetic fast neutrons, an hydrogenous target disposed in said beam and of such dimensions that neutrons in said beam are scattered thereby substantially only once, and means for selectively utilizing neutrons scattered at at least one particular angle whereby neutrons of a particular energy are selected.

References Cited in the file of this patent

UNITED STATES PATENTS

| 2,211,668 | Penning | Aug. 13, 1940 |
| 2,240,914 | Schutze | May 6, 1941 |
| 2,489,436 | Salisbury | Nov. 29, 1949 |
| 2,689,918 | Youmans | Sept. 21, 1954 |

OTHER REFERENCES

Zinn.: Physical Review, vol. 71, No. 11, June 1, 1947, pp. 752–756.

Chagnon et al.: Review of Scientific Instruments, vol. 24, No. 8, August 1953, pp. 656 to 660.